(12) United States Patent
Dong (10) Patent No.: US 10,723,449 B2
(45) Date of Patent: *Jul. 28, 2020

(54) HELICOPTER USING ELECTRIC PROPELLER TORQUE ARM AS POWER SOURCE DRIVING MAIN ROTOR

(71) Applicant: Dawei Dong, French Camp, CA (US)

(72) Inventor: Dawei Dong, French Camp, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/180,004

(22) Filed: Nov. 4, 2018

(65) Prior Publication Data

US 2020/0130822 A1    Apr. 30, 2020

Related U.S. Application Data

(60) Provisional application No. 62/750,462, filed on Oct. 25, 2018.

(51) Int. Cl.
| | |
|---|---|
| *B64C 27/16* | (2006.01) |
| *B64C 27/02* | (2006.01) |
| *B64C 27/24* | (2006.01) |
| *B64C 25/00* | (2006.01) |

(52) U.S. Cl.
CPC ............ *B64C 27/24* (2013.01); *B64C 27/025* (2013.01); *B64C 27/16* (2013.01); *B64C 25/00* (2013.01)

(58) Field of Classification Search
None
See application file for complete search history.

(56) References Cited

U.S. PATENT DOCUMENTS

| | | | | |
|---|---|---|---|---|
| 1,408,899 | A * | 3/1922 | Lanzsy ................... | B64C 27/16 114/271 |
| 1,568,765 | A * | 1/1926 | Leo Ortego ............ | B64C 27/16 244/17.19 |
| 1,609,002 | A * | 11/1926 | Severson ............ | B64C 29/0025 244/7 A |
| 1,955,921 | A * | 4/1934 | Kusse ..................... | B64C 27/16 244/17.11 |
| 2,281,203 | A * | 4/1942 | Pitcairn ................... | B64C 27/16 416/20 R |
| 2,653,779 | A * | 9/1953 | Terry ...................... | B64C 27/18 244/7 A |
| 2,724,446 | A | 11/1955 | Hill | |
| 2,771,255 | A * | 11/1956 | Young ..................... | B64C 27/16 244/17.27 |

(Continued)

*Primary Examiner* — Marc Burgess
(74) *Attorney, Agent, or Firm* — Keith Kline; The Kline Law Firm PC (57) ABSTRACT

A helicopter uses electric propeller torque arm as power source directly driving main rotor to rotate. The helicopter may be battery powered. The helicopter may be without an engine, a clutch, a reducer, a tail driver, a tail boom, a tail rotor and a fuel supply system. The main design goal is to have the output shaft of the high-energy motor being coaxial with the main rotor shaft or having output shafts of a plurality of motors as close as possible to the main rotor shaft. The centrifugal force of the motor(s) is negligible or minimized. The torque arm assembly includes a plurality of torque arms. Each of the torque arm of the plurality of torque arms includes a propeller and a driving system. In the case of a malfunction, the helicopter's main rotor will spin like a maple leaf and will facilitate the spin autorotation landing.

12 Claims, 7 Drawing Sheets

(56) References Cited

U.S. PATENT DOCUMENTS

| | | | | |
|---|---|---|---|---|
| 3,482,803 A | * | 12/1969 | Lindenbaum | B64C 27/18 244/17.11 |
| 4,702,437 A | | 10/1987 | Stearns | |
| 5,370,341 A | | 12/1994 | Leon | |
| 5,934,873 A | | 8/1999 | Greene | |
| 5,971,320 A | * | 10/1999 | Jermyn | B64C 27/16 244/17.23 |
| 7,871,032 B2 | * | 1/2011 | Zhao | B64C 27/16 244/17.19 |
| 8,196,854 B2 | * | 6/2012 | Kusic | B64C 27/12 244/17.11 |
| 9,764,828 B2 | * | 9/2017 | Ulrich | B64C 27/16 |
| 10,076,763 B2 | | 9/2018 | Dong | |
| 2004/0000614 A1 | * | 1/2004 | Leyva | B64C 27/18 244/17.11 |
| 2015/0232178 A1 | * | 8/2015 | Reiter | B64C 27/16 244/7 A |

\* cited by examiner

HELICOPTER USING ELECTRIC PROPELLER TORQUE ARM AS POWER SOURCE DRIVING MAIN ROTOR

CROSS-REFERENCE TO RELATED APPLICATIONS

This patent application claims benefit of a provisional patent application 62/750,462 having a Filing Date of Oct. 25, 2018. The disclosure made in the provisional patent application 62/750,462, the disclosure made in U.S. Pat. No. 10,076,763, the disclosure made in the U.S. Pat. No. 2,724,446 to Hill, the disclosure made in the U.S. Pat. No. 4,702,437 to Stearns, the disclosure made in the patent application number DE102007046299A1 to Haslberger, the disclosure made in the patent application number DE4039907A1 to Kuemmel, the disclosure made in the U.S. Pat. No. 5,934,873 to Greene and the disclosure made in U.S. Pat. No. 5,370,341 to Leon are hereby incorporated by reference.

FIELD OF THE INVENTION

This invention relates generally to a helicopter. More particularly, the present invention relates to a helicopter using a torque arm assembly as a power source driving a main rotor assembly.

BACKGROUND OF THE INVENTION

Currently, the internationally promoted electric helicopters are mostly multi-rotor structures. It has been developed from the structure of multi-rotor drones in recent years. For example, the multi-rotor air taxis, the jets in the movie Iron Man and the trapeze. Those aircrafts are unlikely to obtain the flight management department's flight permit because they (even with installed parachutes) do not meet safe landing requirement in the event of a failure of the power system. Those helicopters are not equipped with autorotation landing functions.

An ideal (desirable flying), electric helicopter is made possible because of high energy motors and high efficient batteries. The helicopter of the present disclosure uses a torque arm assembly with propellers generating power to drive a main rotor assembly.

A traditional helicopter relies on an engine's output energy to rotate a main rotor assembly. The main rotor assembly generates lifting force so that the helicopter takes off. A traditional power drive mode is that the power of an internal combustion engine, a turboshaft engine or an electric motor is decelerated by a gearbox. The torque is increased to drive a large-size main rotor assembly.

For a traditional helicopter, while the main rotor assembly is rotating, the entire fuselage also produces a reaction torque with equivalent magnitude. Therefore, the engine and the fuselage will experience the same torque as the main rotor assembly. A tail rotor with long tail boom system is used to balance this torque. A long tail boom system balances the fuselage so that it maintains the direction of the fuselage and the fuselage does not rotate due to the torque of the main rotor assembly. It is conceivable that the transmission system, the balanced torque tail rotor and the long tail boom system not only consume nearly 20% of the power, but also increase the manufacturing difficulties and control issues. The increased control issues may cause accidents.

Another traditional way to drive the main rotor assembly is that the jet engine mounted at the tip of the main rotor assembly produces thrust force to drive the main rotor assembly to rotate. In this way, there is no torque on the fuselage and no longer needs the tail rotor tail boom and a driving system. But, it encounters a new issue. When the main rotor assembly is under rotation, the weight of the engine installed at the tip of the rotor generates huge centrifugal force. The jet output direction of the jet engine will constantly change following the change of the blade angle of the rotor blade. The fuel and control transmit through the center shaft. The rotary shaft is output to the tip of the rotor blade that rotates at a high speed.

Up to now, there are many test models, but there are very few practical models entering the commercial market. An important feature of the present disclosure is that the output shaft of the driving motor aligns with an axis of the main rotor shaft so that the centrifugal force of the driving motor is negligible (almost zero). A timing belt with a center distance of approximately 1 meter drives the tip of the propeller from inside the torque arm to push or pull the main rotor to rotate. The timing belt and the push or pull propellers weigh less than one pound and the centrifugal force is small. The torque is calculated by the thrust force (pulling or pushing the propeller) multiplying the torque arm radius of approximate one meter giving the power torque required for the main rotor in the unit of kg-meter or N-M. Motor power is delivered from the central shaft to the motor. It increases the drive efficiency by 35%. If without tail rotor and drive train, the helicopter's mechanical structure has been simplified by 40%. The driving method of the present disclosure is especially suitable for light and small helicopters. The main rotor of the helicopter is rotated by pushing and pulling of an electric propeller mounted on the tip of the torque arm. Helicopters include torque arm driving system. Applicant's issued U.S. Pat. No. 10,076,763 discloses half-flight and half-walk propeller lift suspension boom truss module system. A new driving method may be applied to a helicopter that uses an electric propeller torque arm as the power to drive the main rotor.

SUMMARY OF THE INVENTION

A helicopter comprises a fuselage, a landing gear assembly, a tail assembly including a directional control rudder assembly, a control system assembly, a main shaft assembly, a main rotor assembly, a motor assembly and a torque arm assembly. The main rotor assembly is rotatable about a first axis. A centerline of the motor assembly is aligned with the first axis.

The main rotor of the helicopter requires power to drive it to rotate. The rotating rotor blades cause the air with normal pressure to move rapidly below the rotor. It is generally referred to as "downwash velocity", "downwash of the rotor", or "increased pressure. The increased pressure below the rotor creates an upward lift. The power absorbed by a rotor to produce lift is made up of two components:

1. The power used to increase the momentum of the air in the vertical direction: Lift $HP_1$ (first portion of the driving power for increasing vertical air momentum)

$$U = \sqrt{L/2A_\rho} \tag{1}$$

where U is the induced vertical velocity of the air in ft/sec,

L is the lift in lb,
A is the swept area of the rotor in ft², and
ρ is the density of air.
Therefore, from equation (1), $HP_1 = L \times U/550$.

2. The power to rotate the rotor against the drag: The profile drag $HP_2$ (second portion of the driving power).

The power to drive the rotation of a helicopter rotor is in two forms:

A) For a conventional helicopter, the kinetic energy of the rotary output of an internal combustion engine or a turboshaft engine and a high-energy motor is transmitted from the main shaft to the rotor hub through a clutch, a reduction gearbox, and an overrunning clutch so as to rotate the rotor blades.

B) Power from the ramjet mounted on the outer end of the rotor, an engine, a turbojet, or a hydrogen peroxide jet is injected from the tip of the rotor to generate thrust to drive the main rotor blades to rotate.

In order to safely apply the necessary functions of the autorotation in the event of an engine failure, the helicopter must include a design with an optimal autorotation rotor system. For helicopters in production today, the high energy rotor systems provide the pilots of the helicopters with optimal autorotation functions.

Only the French DJINN helicopter meets a higher autorotation criteria. Other co-axial power-driven helicopters having two-layer rotors rotating relative to each other, having no torque acting on the fuselage, and not integrating with tail rotor and tail drive systems, experience the complexity of the engine transmission system and the rotor hub control system. The reduction of the autorotation drop efficiency is caused by the aerodynamic interference of the upper and lower rotors and the coaxial up-and-down counter-rotation rotor. The efficiency is increased in climbing and hovering. It is in the opposite under the condition of autorotation landing. Thus, the performance is not as good as a single-blade traditional helicopter autorotation safe landing. Therefore, for safety reason, it is critical to use a large diameter main rotor having a small disk load per square foot (for example, 1.5 lb/ft²) to achieve optimal aerodynamic design. The selection above includes consideration of: trade studies of the main rotor geometry being made for solidity, tip speed, diameter, airfoil, chord and twist. In this way, large diameter for freely rotating and small weight are keys to meet safe autorotation landing requirements.

In one example of a prototype of the present disclosure, the (empty) fuselage structure weighs 254 pounds. The additional second battery pack weighs 30 pounds. The pilot weighs 220 pounds. The helicopter gross weight is 504 pounds (230 kg). The helicopter has a 18.5-ft diameter dimension with a 5.6-inch chord rotor, operating at 550 feet per second tip speed. Each blade weights 11 lbs of which 1 lbs is distributed at the tip to produce a high inertia rotor for efficient autorotation. It results in a disc loading of 1.5 lb/ft², with a requirement of 32 horsepower to hover in a 2,000 ft and 70 F degrees environment.

The electric propeller will be used to directly drive the main rotor of the helicopter through the torque arm assembly. The torque equation is:

$$T_R = h.p. \times 550/(2\pi) \times N \quad (2)$$

where $T_R$ is the main rotor torque in lbs-ft, and
N is rotor speed in revolutions per second.

While the rotor is rotating at 8.3 revolutions per second, the torque is 311 lb.-ft (43 kg-m; 420-NM). The calculated results show that a torque arm of approximate one meter in length (0.9 meter to 1.1 meter) is sufficient to generate a torque of 43 kg-m for the main rotor assembly.

The driving power is reduced from 32 hp to 16 hp. The efficiency is doubled. The fly time limit of the electric helicopter will be more than one hour. It is a manned helicopter with safely autorotation landing capability. It meets the requirement of FAA FAR Part-103.

The advantage of using an electric propeller torque arm as the power to drive the main rotor includes:

1. The driving efficiency is increased by 35% because of direct driving and without tail rotor system and main drive train.
2. The helicopter's mechanical structure has been simplified by 40%.
3. It is easier to hover especially in a cross-wind condition.
4. It provides static longitudinal stability at all air speeds.
5. The rotor operates at lower angles of attack, that is, the angle at which the blade stalls is far removed from the normal flight blade angle. It allows a wide margin of safety.
6. VTOL operations at high altitudes and high temperatures are possible.
7. Rotor speed is not critical because the present disclosure allows operation over a wide range of RPM with an overspeed capability as much as 30% over the designed RPM.
8. The ability to accelerate forward and climb simultaneously in a smooth and powerful manner is improved.
9. Slower power-off descents using the inertia stored in the main rotor and torque arm for safe autorotation landings are possible.
10. Gyroscopic stabilization due to the massive main rotor plus torque arm is improved.

DETAILED DESCRIPTION OF THE INVENTION

Figure 1:
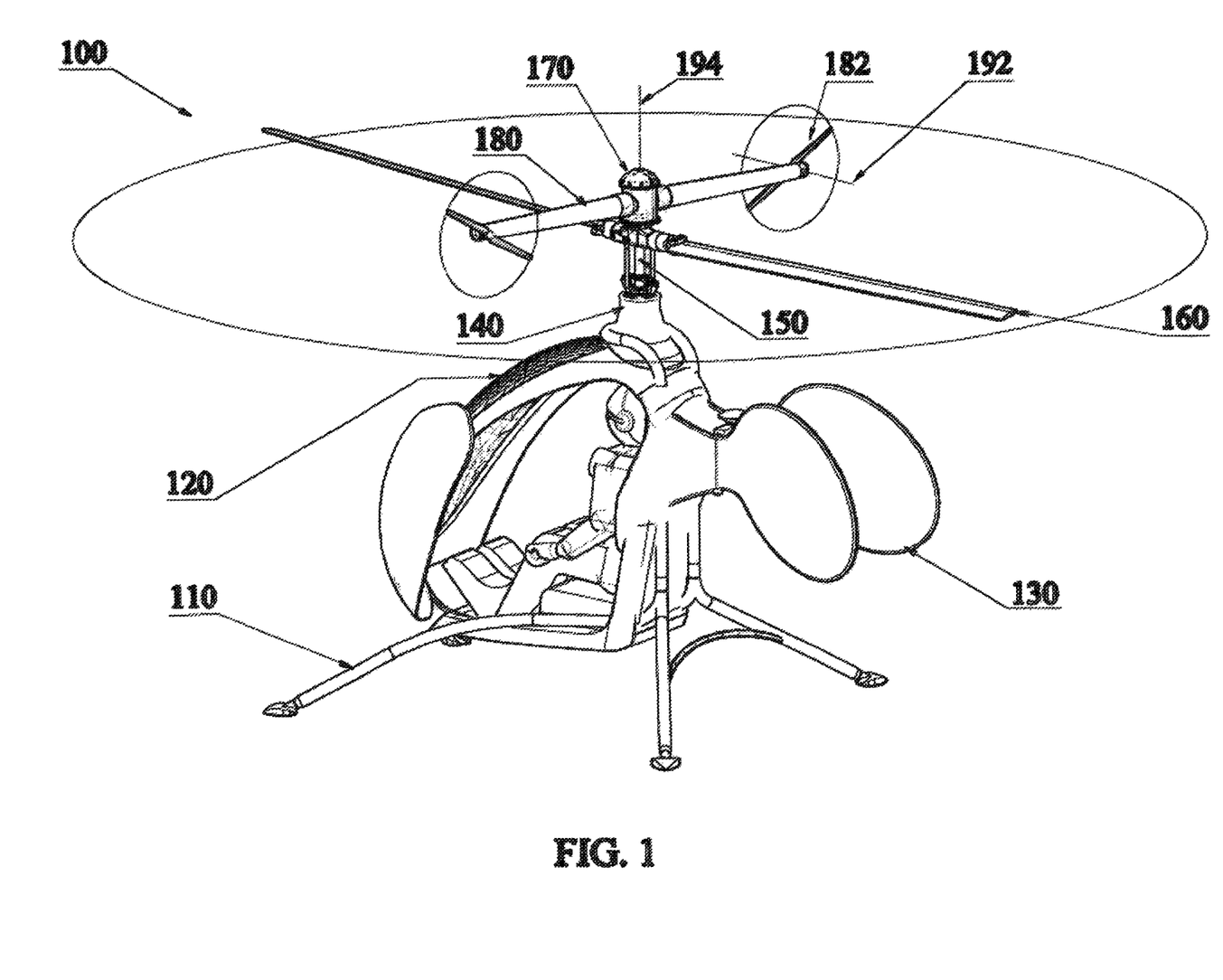
FIG. 1 is a helicopter in examples of the present disclosure.

FIG. 1 is a helicopter 100 in examples of the present disclosure. The helicopter 100 comprises a fuselage 120, a landing gear assembly 110, a tail assembly including a directional control rudder 130, a control system assembly 140, a main shaft assembly 150, a main rotor assembly 160, a motor assembly 170 and a torque arm assembly 180. In examples of the present disclosure, the landing gear assembly 110 is directly attached to a bottom portion of the fuselage 120. The directional control rudder 130 is directly attached to a back portion of the fuselage 120. The control system assembly 140 is attached to the fuselage 120. The main shaft assembly 150 is attached to the control system assembly 140. The main rotor assembly 160 is attached to the main shaft assembly 150. The torque arm assembly 180 is attached to the main shaft assembly 150. In examples of the present disclosure, the main rotor assembly 160 is positioned between the fuselage 120 and the torque arm assembly 180 in a direction along the axis 194. The main rotor assembly 160 is positioned between the fuselage 120 and the motor assembly 170 in the direction along the axis 194. In examples of the present disclosure, a centroid of the motor assembly 170 is on the axis 194. A centroid of the torque arm assembly 180 is on the axis 194.

In examples of the present disclosure, the main rotor assembly 160 is rotatable about the axis 194. A centerline of the motor assembly 170 is aligned with the axis 194. The motor assembly 170 drives the propeller 182. In examples of the present disclosure, the torque arm assembly comprises one, two (shown in FIG. 1), three, four (shown in FIG. 4), five, or six torque arms. Each torque arm of the torque assembly comprises a propeller 182. The propeller 182 is rotatable about the axis 192. The axis 192 is perpendicular to the axis 194. In examples of the present disclosure, each torque arm of the torque arm assembly 180 is about one meter in length. In examples of the present disclosure, a length of each torque arm of the torque arm assembly 180 is in a range from 0.9 meter to 1.1 meter.

Figure 4:
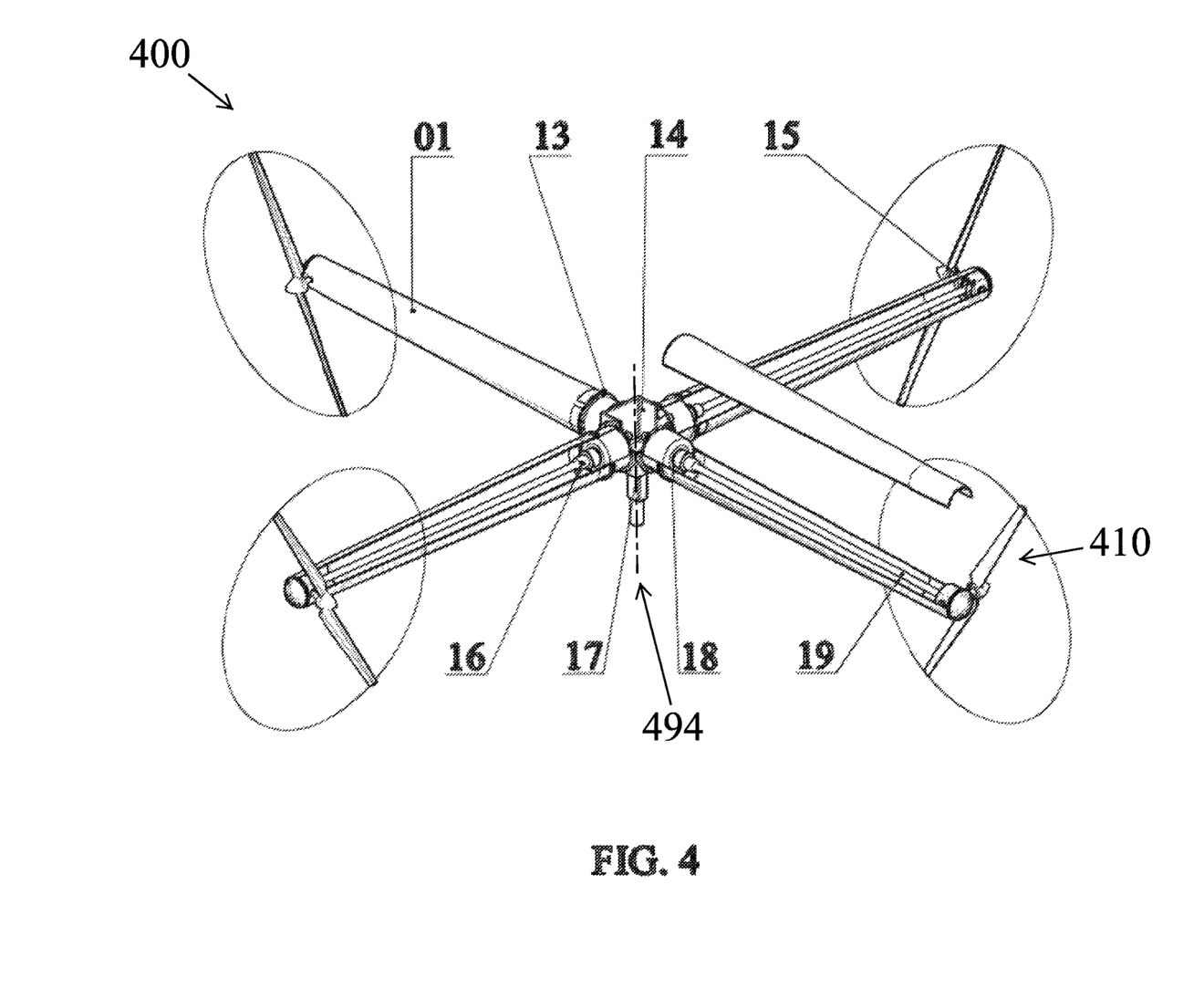
FIG. 4 is an exploded view of a torque arm assembly in examples of the present disclosure.

In examples of the present disclosure, a plurality of motors of the motor assembly 170 drives the propeller 182 through the bevel gear set 15 of FIG. 4 and the driving shaft 19 of FIG. 4.

In examples of the present disclosure, the propeller is powered by electric power transmitted from a center of the main shaft assembly 150 and the propeller 182 generates push-pull force. Therefore, the main rotor assembly 160 rotates by an energy in the order of kilogram-meters. In one example, the propeller 182 generates torque and pulling a tip of a torque arm of the torque arm assembly 180 so that the torque arm assembly 180 rotates counterclockwise. In another example, the propeller 182 generates torque and pushing a tip of a torque arm of the torque arm assembly 180 so that the torque arm assembly 180 rotates clockwise.

In examples of the present disclosure, the motor assembly 170 is powered by a battery. In examples of the present disclosure, the helicopter 100 excludes an engine and excludes a mechanical transmission system on the fuselage 120. In examples of the present disclosure, the directional control rudder 130 excludes a tail boom and excludes a tail rotor system balancing torque.

Figure 2:
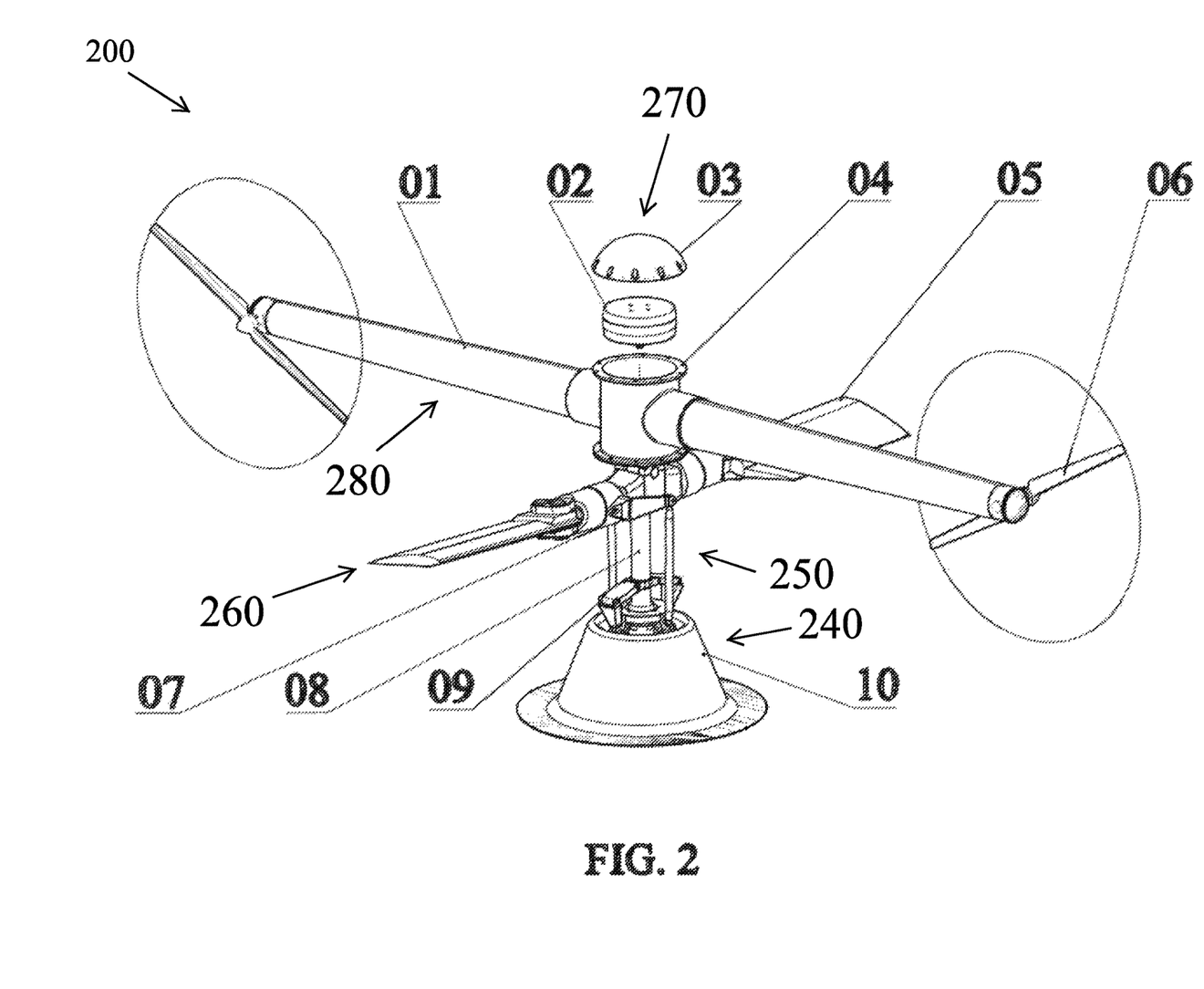
FIG. 2 is an exploded view of a driving assembly including a torque arm assembly and a main rotor assembly of a helicopter in examples of the present disclosure.

FIG. 2 is an exploded view of a driving assembly 200 of a helicopter in examples of the present disclosure. The driving assembly 200 comprises a control system assembly 240, a main shaft assembly 250, a main rotor assembly 260, a motor assembly 270 and a torque arm assembly 280.

In examples of the present disclosure, the torque arm assembly 280 includes a plurality of torque arms. Each of the torque arm of the plurality of torque arms includes a torque arm tube 1 and a propeller 6. In examples of the present disclosure, the torque arm tube 1 is made of a lightweight, high-strength carbon fiber material. In examples of the present disclosure, a length (radius) of each torque arm of the torque arm assembly 280 is in a range from 0.9 meter to 1.1 meter so as to generate sufficient lifting force without adding significant weight. In examples of the present disclosure, the propeller 6 is a large-pitch, high-speed propeller. The propeller 6 is mounted on a distal end (tip) of the torque arm.

In examples of the present disclosure, the main rotor assembly 260 includes a rotor blade 5 and a rotor hub 7. The main shaft assembly 250 includes a shaft 8. The motor assembly 270 includes a high-energy direct-current (DC) motor 2, a motor cover 3 and a motor housing 4. In examples of the present disclosure, the high-energy DC motor 2 is mounted coaxially with the main shaft assembly 250. In examples of the present disclosure, a diameter of a bottom portion of the motor cover 3 is the same as a diameter of a top portion of the motor housing 4. If the motor cover 3 is not installed, another set of torque arms may be superimposed. In one example, a motor speed controller is installed in the motor housing 4. In examples of the present disclosure, the motor housing 4 is made of an aluminum alloy material and then processed by a computer numerical control (CNC) machining. In examples of the present disclosure, the motor housing 4 is formed by a welding process followed by a CNC machining.

In examples of the present disclosure, the control system assembly 240 includes a swashplate system assembly 9 and a control system housing 10. The control system assembly 240 includes swashplate control servos, collective pitch control servos and electronic control system.

Figure 3:
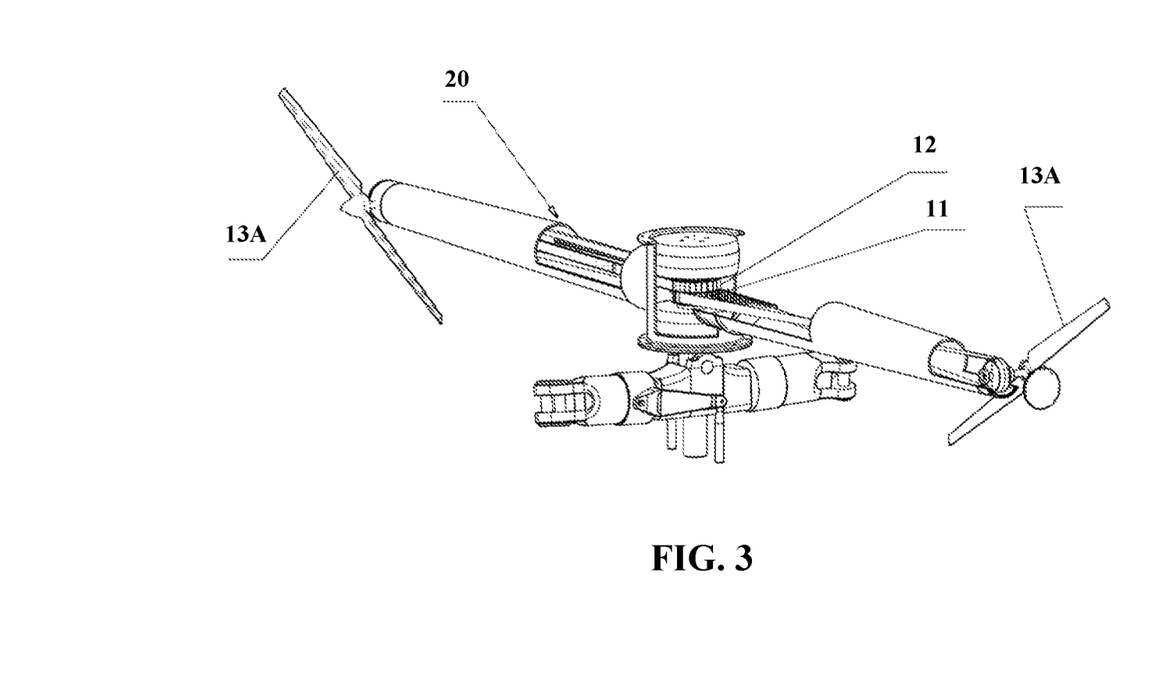
FIG. 3 is an exploded view of a partial view of a sub-assembly in examples of the present disclosure.

FIG. 3 is an exploded view of a subassembly 300 including a main rotor assembly 360, a motor assembly 370, and a torque arm assembly 380 in examples of the present disclosure. The motor assembly 370 includes a high-energy DC motor 2 and a motor housing 4. In examples of the present disclosure, the torque arm assembly 380 includes a torque arm tube 1 and a timing pulley 11. The timing pulley 11 mounted on an output shaft of the high-energy DC motor 2. A timing belt 12 connects the timing pulley 11 to a propeller 13A. The timing belt 12 has a span distance (center distance) of about one meter. The motor assembly 370 drives the propeller 13A through the timing pulley 11 and the timing belt 12. The main rotor assembly 360 is connected to the motor assembly 370 at the location 14A. It should be apparent to those skilled in the art that each propeller 13A will have an associated timing pulley 11 and timing belt 12.

FIG. 4 is an exploded view of a torque arm assembly 400 in examples of the present disclosure. In examples of the present disclosure, the torque arm assembly 400 has four torque arms and a coupling joint 17. Each torque arm of the torque arm assembly 400 includes a torque arm tube 1, a connecting piece 13, a central motor case 14, a bevel gear set 15, a flexible coupling 16, a plurality of high-energy motors 18 and a driving shaft 19. The bevel gear set 15 connects the driving shaft 19 to the propeller 410. The propeller 410 drives the driving shaft 19 through the bevel gear set 15. In examples of the present disclosure, the connecting piece 13 is made of an aluminum alloy material. The connecting piece 13 is connected to the central motor case 14. A housing of the central motor case 14 is made of an aluminum material and is processed by CNC machining. The bevel gear set 15 contains right-angle bevel gears. The driving shaft 19 is made of a carbon fiber material. In examples of the present disclosure, a first distance between the axis 494 and the respective centroid of each motor of the plurality of motors 18 is at least fifteen times smaller than a second distance between the axis 494 and a respective center of each propeller 410 of the plurality of torque arms of the torque arm assembly.

Figure 5:
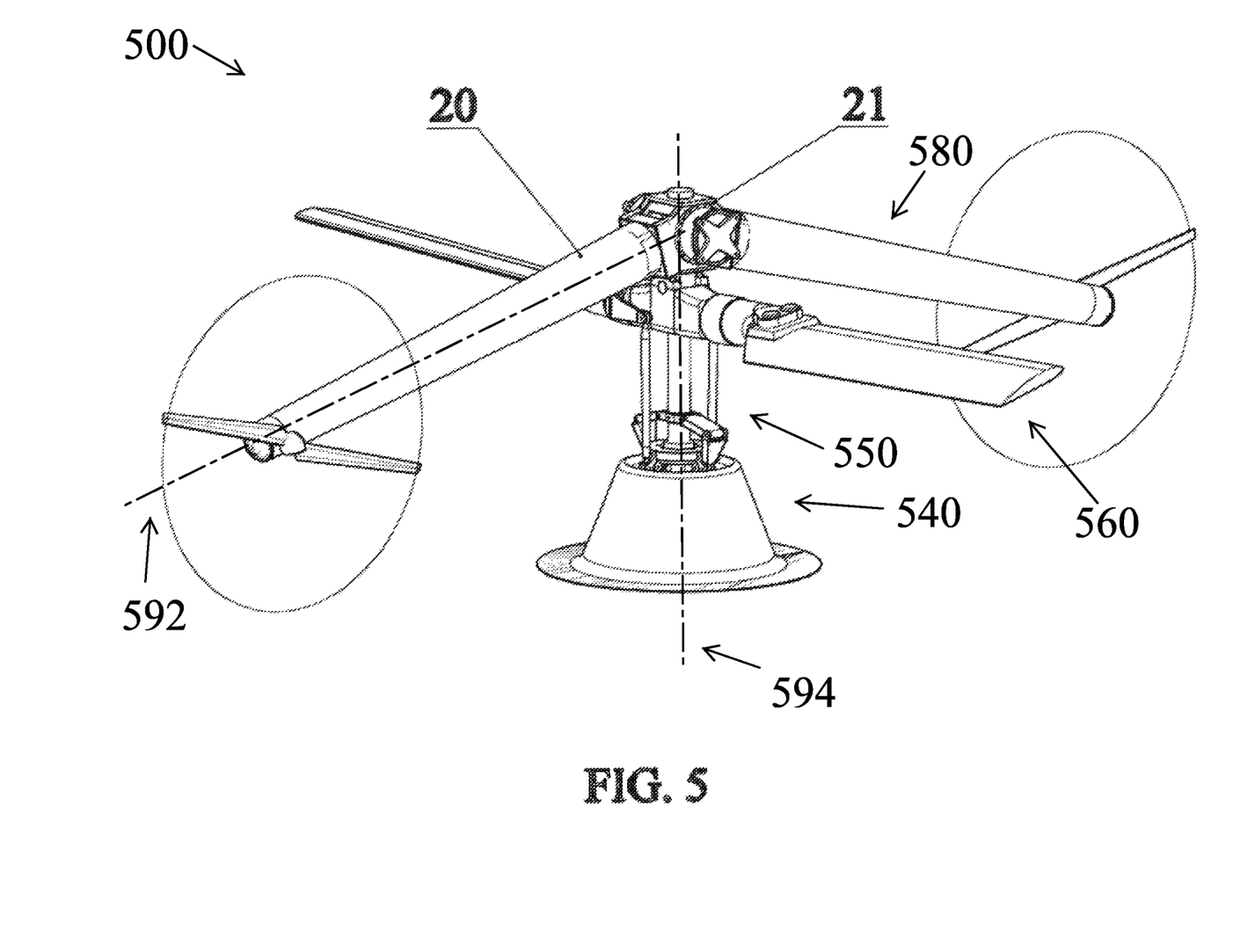
FIG. 5 is a driving assembly including a torque arm assembly of a helicopter in examples of the present disclosure.

FIG. 5 is a driving assembly 500 of a helicopter in examples of the present disclosure. The driving assembly 500 comprises a control system assembly 540, a main shaft assembly 550, a main rotor assembly 560, and a torque arm assembly 580. Each torque arm 20 of the torque arm assembly 580 has a drooping angle. Each centerline 592 of a corresponding torque arm 20 of the plurality of torque arms of the torque arm assembly 580 forms a drooping angle with respect to the axis 594 so that a respective center of each propeller of the plurality of torque arms of the torque arm assembly 580 is on a same plane perpendicular to the axis 594. The advantage is to reduce the interference of the component force of the torque arm 20 asserted on the main rotor assembly 560. The center of the gravity of the torque arm assembly 580 is lowered. The stability of the rotation of the main rotor assembly 560 is improved. In examples of the present disclosure, a motor and a timing pulley are installed in the housing 21.

Figure 6:
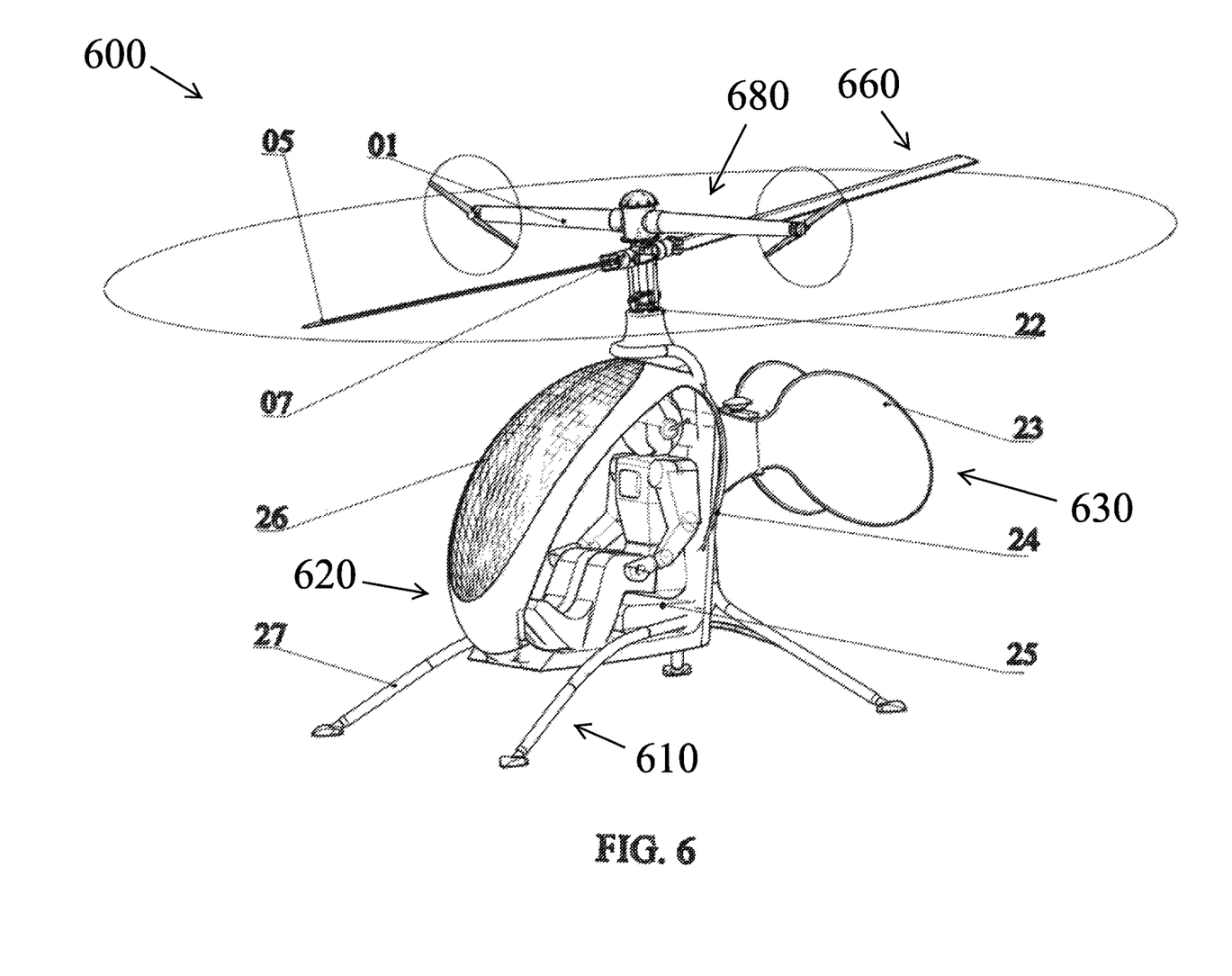
FIG. 6 is a helicopter in examples of the present disclosure.

FIG. 6 is a helicopter 600 in examples of the present disclosure. The helicopter 600 comprises a fuselage 620, a landing gear assembly 610, a directional control rudder 630, a main rotor assembly 660 and a torque arm assembly 680. Each of the torque arm of the torque arm assembly 680 includes a torque arm tube 1. The main rotor assembly 560 includes a rotor blade 5 and a rotor hub 7. The housing 22 encloses swashplate control servos, collective pitch control servos and an electronic control system with the electronic control system assembly. The directional control rudder 630 is under the down-washing flow the main rotor assembly 660. The directional control rudder 630 controls the fuselage 620 to turn left or right along the axis 194 of FIG. 1. The directional control rudder 630 includes steering surface 23 to guide the flying direction of the helicopter. The fuselage 620 including a cabin 24, a pilot seat 25 and a front windshield 26. A battery pack is under the pilot seat 25. The landing gear assembly 610 includes landing gears 27. In examples of the present disclosure, the landing gears 27 are made of a carbon fiber material.

The main rotor of the helicopter is driven by the power around the main shaft. If the power to drive its rotation is not from the main shaft, so that the fuselage has no reaction torque, it must be a power unit that rotates with the main rotor. This power unit also have a weight of at least a few kilograms per horsepower. According to the theoretical formula of centrifugal force:

$$F = W/g (\text{Angular Velocity in Radians/Sec.})^2 \times K_R (\text{Radius of } CG) \qquad (3)$$

where F is the centrifugal force in lbs;
W is weight in lbs;
g is acceleration due to gravity (32.2 ft/sec/sec); and
$K_R$ is radius of gyration in ft.

The weight W of a motor with a large horsepower is in the order of several pounds. If the motor is installed in the middle or tip of the main rotor assembly, the radius R will be a dozen feet. From W multiplied by R and multiplied by the square of the angular velocity, the value of the centrifugal force will exceed several thousand pounds (in the order of tons).

An important aspect of the present invention is that the motor W is fixed at the center of the rotating shaft so that the radius R is zero (or almost zero). The centrifugal force generated by the very heavy motor is zero (or almost zero). This makes the power system of the present disclosure practical for manned light-weight helicopter applications.

The electric propeller drives the torque arm of the main rotor. The centrifugal force of the torque arm system has three portions:

The first is to drive the motor. Since its output shaft is coaxial with the rotation axis of the main rotor, R is zero, so the centrifugal force of this portion is zero (or almost zero), and can be neglected.

The second is the torque arm and the weight W of the synchronous timing belt or driving shaft. Radius R is measured from the center of the rotary mass. The torque arm is made of carbon fiber composite and weighs about 400 grams. The synchronous toothed belt with a center distance of one meter has a weight of 160 grams. Radius Kr of gyration is calculated. This is the point where all the weight of a single rotor blade can be considered to act for the purposes of calculating the centrifugal force. The radius of gyration is determined by considering all the weight is concentrated at the point used to calculate the centrifugal force. The radius of gyration of a flat section rotating about one end:

$$K_r^2 = R^2/3 \qquad (4)$$

The third is the centrifugal force generated by pushing and pulling the propeller and the small transmission timing pulley or the bevel gear set with the weight W (About 200 grams) with radius R. On the torque arm, the determination of the position of radius R of the driving propeller depends on two major factors: Firstly, the rotation speed of the concentration point is suitable for pushing and pulling the working requirements of the propeller, and with suitable speed and pitch of the propeller. Power is adapted to drive the blade of main rotor and meets the requirement of the tip speed. Secondly, if the distance from the center of rotation R is too large, the transmission requirements are increased, the weight is increased, and the centrifugal force is increased.

The conclusion of the test is that R=1.0 m is a suitable radius. The torque is in kg-meter or newton-meter. The rotational speed at this radius is approximately 200 km/h (50 m/s). It is the suitable working range for the push-pull propeller. The top of the main rotor hub of the helicopter is connected to a coupling joint 17, aligned with the helicopter main shaft, for driving the rotation of the helicopter main shaft. The main shaft 8 of the helicopter is a conventional hollow, tubular shaft. The 48V-60V DC power transmission line that drives the DC motor passes through the center of the main shaft. The speed control signal of the power DC motor is transmitted from the center of the main shaft to the torque arm. High-energy DC motor 2 may be a high-power brushless motor having an output shaft aligned with the centerline of the main rotor of the helicopter. The motor cover 3 is above the motor housing 4. A speed control of the motor is mounted inside the motor housing 4. It is the central main component of the fixed driving motor, torque arm and connecting main shaft fixture. It is also possible to superimpose upwardly connecting another identical torque arm center machine case. The timing pulley 11 is a synchronous timing pulley mounted on the output shaft of high-energy motor. The timing belt 12 is a high-intensity synchronous timing belt with a center distance of 1.0 m. The torque arm tube 1 is made of lightweight, high-strength carbon fiber tube.

The center of the torque arm drives the large pitch high-speed propeller mounted on the torque arm tip to pull or push the torque arm. Another type of torque arm is constructed such that a plurality of high-energy motors 18 of different axes from the main rotor are at a minimum equal distance radius. The planets are arranged around the main axis of rotation. The flexible coupling 16 surrounds the center of the torque arm. The driving shaft 19 and bevel gear set 15 are at the center of the torque arm. It drives the torque arm transmission mode of the large pitch propeller. The plurality of torque arm planets forming on the same plane are arranged on the central motor case 14 made of the aluminum alloy. Drive may include 3, 4, 5, 6, and even more torque arms so as to increase the required turning torque.

In order not to cause the driving force of the torque arm mounted on the main rotor hub to be higher than the rotation plane of the main rotor, the torque arm 20 hangs down and has a droop angle. The rotational drive surface that pulls or pushes the main rotor is the same surface as the rotation of the main rotor. In order to reduce the interference of the dividing force of the torque arm to the main rotor, the location of the center of gravity is lowered. The stability of the rotation of the main rotor is increased.

In one example of the prototype of the present disclosure, the helicopter rotor has a diameter of 18.5 feet. The rotor solidity is reduced to 0.03. The chord rotor is 5.6 inches. The main rotor hub is a 2-bladed underslung teetering system. The swashplate and the collective pitch control are controlled by electronic numerical control servos. It is easier for the pilots of the helicopters to switch to automatic driving systems for autonomous flight and for safely smooth autorotation landing. This torque-arm-driven electric single-person helicopter test prototype is produced in accordance with the requirements of FAA-FAR Part 103. The empty weight of the helicopter is less than 254 lb. (115 kg). The fuselage 620 and the landing gears 27 are made of light-weight, carbon fiber or aluminum alloy composite material. The weight of the main rotor assembly 160, the rotor hub 7, swashplate system assembly 9, control steering gear and bracket suspension is about 50 pounds. The weight of fuselage and the landing gear is 66 pounds. The weight of the drive torque arm assembly is no more than 22 pounds. LiPo's first battery pack is 96 pounds. The remaining accessories are 20 pounds. The sum is 254 pounds.

In accordance with FAR Part 103 with 220 pounds limitation for the occupant or pilot, there is a load of 5 gallons of fuel. It will be replaced by a second battery pack and weighs 36 pounds. The total weight of the onboard battery of the first and second battery packs is A 132-pound (60 kg) lithium polymer battery. Total of 10 KW×h. It will have a flying time of more than one hour. The total weight of the test helicopter is 510 pounds (232 kg). The battery pack is under the pilot seat 25. The 48V-60V DC will be transmitted through the hollow spindle to the top torque arm to operate the motor in the center of the torque arm. Synchronous timing belt or driving shaft drives the large-pitch high-speed propeller at the outer end of the torque arm to push and pull the helicopter's main shaft to drive the main rotor to rotate. It is similar to the Volga River trackers.

The torque arm drives the main rotor of the helicopter. The larger the radius of the torque arm, the greater the torque and the greater the centrifugal force. The speed at which the propeller is driven is increased, and the rotational resistance is also increased. In one example, the present disclosure uses calculation and manufacturing techniques to reduce the drag resistance of the torque arm by determining an optimal value of the torque arm radius. The helicopter of the present disclosure significantly reduces power consumption of the power-driven mode of the conventional structure of the helicopter by eliminating fuel supply for rotating internal combustion engines or turboshaft engines, by reducing the numbers of gears or belt, and by eliminating the tail rotor. The complexity and weight of the structure is reduced by nearly 40%. It allows the electric helicopter with battery capacity to increase the flight time by increasing the carrying capacity of the battery pack. At the same time, the driving efficiency of the torque arm is higher than that of the shaft drive. The increase of the driving efficiency also allows the battery pack to last longer. Conventionally, it has been tested on small helicopter models to fix the motor directly to the tip of a crossbar (for example, U.S. Pat. No. 5,934,873 to Greene), but, it is not suitable for larger payload manned helicopters because of the huge centrifugal force resulting in difficulty of helicopter control and operation. The present disclosure discloses that the driving motor is arranged coaxially with the main rotor so that the centrifugal force of the driving motor is zero (or almost zero). This driving method can be applied to a manned helicopter.

Figure 7:
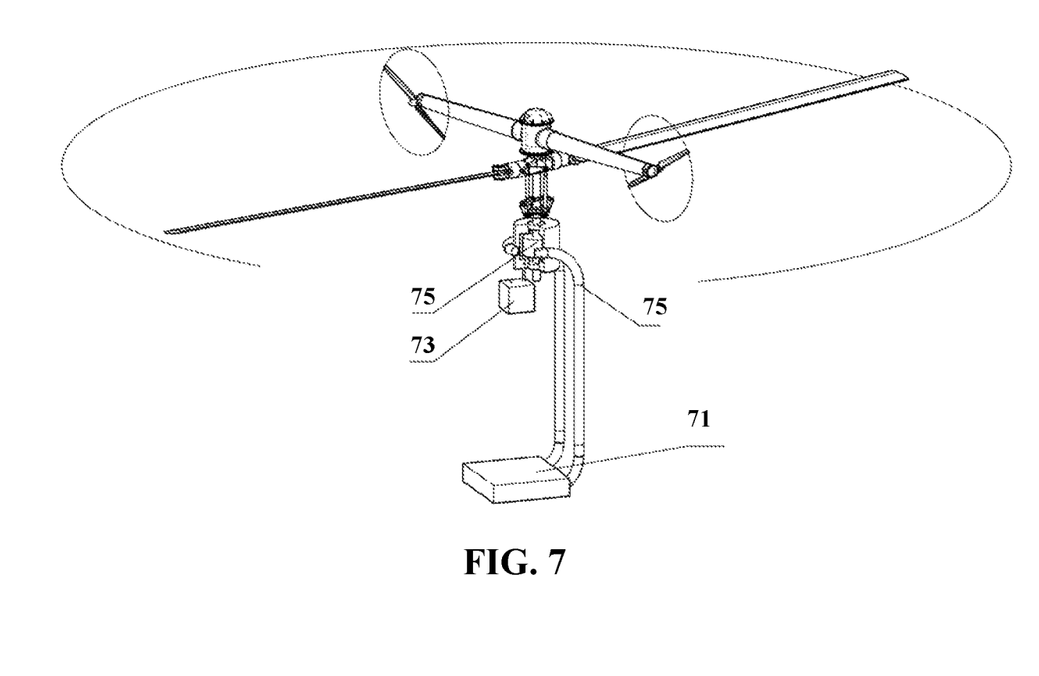
FIG. 7 shows the power supply (battery) and the control module.

FIG. 7 shows the power supply (battery) 71 and the signal control module 73 utilized in various embodiments of the present invention. Control signals from the control module 73 and power wiring from the battery 71 pass through channels 75 to the motor assembly.

Those of ordinary skill in the art may recognize that modifications of the embodiments disclosed herein are possible. For example, a total number of torque arms may vary. Other modifications may occur to those of ordinary skill in this art, and all such modifications are deemed to fall within the purview of the present invention, as defined by the claims.

The invention claimed is:

1. A helicopter comprising:
   a fuselage of the helicopter;
   a torque arm assembly rotatable about a first axis, the torque arm assembly comprising a pair of propellers and a motor housing;
   a main rotor assembly mounted coaxially with the torque arm assembly and rotatable about the first axis;
   a motor assembly mounted entirely within the motor housing of the torque arm assembly and outside the fuselage of the helicopter, the motor assembly being mounted coaxially with the torque arm assembly, wherein the torque arm assembly, the main rotor assembly, and the motor assembly are mounted on a single main shaft, the propellers being driven by the motor assembly such that all motive force for the torque arm assembly and the main rotor assembly occurs within the torque arm assembly; and
   wherein torque generated by the propellers rotates the torque arm assembly and the main rotor assembly about the first axis.

2. The helicopter of claim 1, wherein the torque arm assembly comprises for each propeller:
   a timing pulley; and
   a timing belt connecting the timing pulley to the propeller;
   wherein the motor assembly drives the propeller through the timing pulley and the timing belt.

3. The helicopter of claim 1 further comprising a battery, wherein power is transmitted from the battery to the motor assembly via a connecting channel.

4. The helicopter of claim 3 further comprising a control system assembly attached to the fuselage, wherein a plurality of control signals of the control system assembly are transmitted to the motor assembly through a channel connecting the control system assembly to the motor assembly.

5. The helicopter of claim 1, wherein the helicopter is a manned helicopter, an unmanned helicopter, or a multiple-rotor drone.

6. The helicopter of claim 1, wherein a rotational axis of each of the propellers of the torque arm assembly is perpendicular to the first axis.

7. An apparatus comprising:
   A fuselage;
   a torque arm assembly rotatable about a first axis, the torque arm assembly comprising a pair of propellers and a motor housing;

a main rotor assembly mounted coaxially with the torque arm assembly and rotatable about the first axis;

a motor assembly mounted outside the fuselage of the apparatus and entirely within the motor housing of the torque arm assembly, the motor assembly being mounted coaxially with the torque arm assembly, wherein the torque arm assembly, the main rotor assembly, and the motor assembly are mounted on a single main shaft, the propellers being driven by the motor assembly such that all motive force for the torque arm assembly and the main rotor assembly occurs within the torque arm assembly; and wherein torque generated by the propellers rotates the torque arm assembly and the main rotor assembly about the first axis.

8. The apparatus of claim 7, wherein the torque arm assembly comprises for each propeller:

a timing pulley; and a timing belt connecting the timing pulley to the propeller; wherein the motor assembly drives the propeller through the timing pulley and the timing belt.

9. The apparatus of claim 7 further comprising a battery, wherein power is transmitted from the battery to the motor assembly via a connecting channel.

10. The apparatus of claim 9 further comprising a control system assembly, wherein a plurality of control signals of the control system assembly are transmitted to the motor assembly through a channel connecting the control system to the motor assembly.

11. The apparatus of claim 7, wherein the apparatus is a manned helicopter, an unmanned helicopter, or a multiple-rotor drone.

12. The apparatus of claim 7, wherein a rotational axis of the propeller of the torque arm assembly is perpendicular to the first axis.

* * * * *